(12) United States Patent
Sule et al.

(10) Patent No.: US 11,960,975 B2
(45) Date of Patent: Apr. 16, 2024

(54) SYSTEMS AND METHODS FOR MULTI-INSTANCE LEARNING-BASED CLASSIFICATION FOR STREAMING INPUTS

(71) Applicant: QUALCOMM Incorporated, San Diego, CA (US)

(72) Inventors: Dineel Sule, San Diego, CA (US); Subrato Kumar De, San Diego, CA (US); Wei Ding, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1201 days.

(21) Appl. No.: 15/447,397

(22) Filed: Mar. 2, 2017

(65) Prior Publication Data

US 2018/0046941 A1 Feb. 15, 2018

Related U.S. Application Data

(60) Provisional application No. 62/374,597, filed on Aug. 12, 2016.

(51) Int. Cl.
*G06N 20/00* (2019.01)
*G06F 21/56* (2013.01)

(52) U.S. Cl.
CPC ............. *G06N 20/00* (2019.01); *G06F 21/56* (2013.01)

(58) Field of Classification Search
CPC ................................ G06N 20/00; G06F 21/56
See application file for complete search history.

(56) References Cited

U.S. PATENT DOCUMENTS

| | | | |
|---|---|---|---|
| 7,813,945 B2 | 10/2010 | Bonissone et al. | |
| 7,822,252 B2 | 10/2010 | Bi et al. | |
| 7,987,144 B1 | 7/2011 | Drissi et al. | |
| 8,051,021 B2 | 11/2011 | Aggarwal et al. | |
| 8,448,245 B2 * | 5/2013 | Banerjee | G06F 21/51 709/224 |
| 8,521,667 B2 * | 8/2013 | Zhu | H04L 63/1408 706/13 |
| 8,595,153 B2 | 11/2013 | Drucker et al. | |
| 8,838,992 B1 * | 9/2014 | Zhu | G06F 21/563 713/186 |
| 9,288,220 B2 * | 3/2016 | Raugas | H04L 63/145 |

(Continued)

OTHER PUBLICATIONS

Fu, Milis: Multiple Instance Learning with Instance Selection (Year: 2011).*

(Continued)

*Primary Examiner* — Abdullah Al Kawsar
*Assistant Examiner* — Tewodros E Mengistu
(74) *Attorney, Agent, or Firm* — The Marbury Law Group

(57) ABSTRACT

A method for multi-instance learning (MIL)-based classification of a streaming input is described. The method includes running a first biased MIL model using extracted features from a subset of instances received in the streaming input to obtain a first classification result. The method also includes running a second biased MIL model using the extracted features to obtain a second classification result. The first biased MIL model is biased opposite the second biased MIL model. The method further includes classifying the streaming input based on the classification results of the first biased MIL model and the second biased MIL model.

27 Claims, 10 Drawing Sheets

(56) References Cited

U.S. PATENT DOCUMENTS

| | | | | |
|---|---|---|---|---|
| 9,356,946 | B1* | 5/2016 | Daswani | H04L 63/1425 |
| 2013/0247192 | A1* | 9/2013 | Krasser | H04L 63/1425 |
| | | | | 726/23 |
| 2015/0102216 | A1* | 4/2015 | Roder | G16B 40/00 |
| | | | | 250/282 |
| 2017/0032279 | A1* | 2/2017 | Miserendino | G06N 20/00 |
| 2017/0295187 | A1* | 10/2017 | Havelka | H04L 63/1441 |
| 2018/0004855 | A1* | 1/2018 | Bolshinsky | G06F 40/134 |
| 2018/0225593 | A1* | 8/2018 | Cozine | G06Q 30/0278 |

OTHER PUBLICATIONS

Khoussainov, Ensembles of Biased Classifiers (Year: 2005).*
Andra, Frequency Coding: An Effective Method for Combining Dichotomizers (Year: 2007).*
Kumar, A Machine Learning based Web Spam Filtering Approach, May 23, 2016 (Year: 2016).*
Amores J., "Multiple Instance Classification: Review, Taxonomy and Comparative Study", Artificial Intelligence 201:81-105,doi:10.1016/j.artint.2013.06.003, Jul. 2, 2013, pp. 1-36.
Bunescu R.C., et al., "Multiple Instance Learning for Sparse Positive Bags", Proceedings of the 24th International Conference on Machine Learning, Corvallis, OR, 2007, pp. 105-112.
Chiu D., et al., "Future Directions in Multiple Instance Learning", Journal of Theoretical and Applied Computer Science, vol. 7, No. 3, 2013, pp. 29-39.
Li B., et al., "Context-Aware Multi-Instance Learning based on Hierarchical Sparse Representation", 11th IEEE International Conference on Data Mining, Dec. 2011, pp. 370-377.
Liu Q., et al., "MI-ELM: Highly Efficient Multi-Instance Learning Based on Hierarchical Extreme Learning Machine", ResearchGate article, Neurocomputing (173), Jan. 2016, pp. 1044-1053.
Salmani K., et al., "Multi-Instance Active Learning with Online Labeling for Object Recognition", Proceedings of the Twenty-Seventh International Florida Artificial Intelligence Research Society Conference, 2014, pp. 406-411.
Waterfall Diagram: "Blocking JavaScript with Web Page Test" Retrieved from internet on Mar. 13, 2017, http://www.websiteoptimization.com/speed/tweak/blocking-javascript/, pp. 1-5.
Wikipedia: "Multiple-Instance Learning", Retrieved from internet on Mar. 13, 2017, https://en.wikipedia.org/wiki/Multiple-Instance_learning, 1 Page.
Anonymous: "Ensembles of Classifiers—Wikipedia", Aug. 24, 2015, XP055395746, Retrieved from the Internet: URL:https://en.wikipedia.org/w/index.php?title=Ensembles_of_classifiers&oldid=677612755 [retrieved on Aug. 3, 2017], 2 pages.
Fu Z., et al., "MILIS: Multiple Instance Learning with Instance Selection", IEEE Transactions on Pattern Analysis and Machine Intelligence, May 1, 2011, vol. 33, No. 5, XP011373545, ISSN: 0162-8828, DOI: 10.1109/TPAMI.2010.155, pp. 958-977.
International Search Report and Written Opinion—PCT/US2017/034676—ISA/EPO—dated Aug. 23, 2017.
Khoussainov R., et al., "Ensembles of Biased Classifiers", Proceedings of the 22nd International Conference on Machine Learning, Aug. 7, 2005, XP058203939, pp. 425-432.
Zhou Z.H., et al., "Ensembles of Multi-Instance Learners", In: Network and Parallel Computing, Jan. 1, 2003, vol. 2837, Springer International Publishing, Cham 032548, XP055395044, pp. 492-502.

* cited by examiner

SYSTEMS AND METHODS FOR MULTI-INSTANCE LEARNING-BASED CLASSIFICATION FOR STREAMING INPUTS

RELATED APPLICATIONS

This application is related to and claims priority from U.S. Provisional Patent Application Ser. No. 62/374,597, filed Aug. 12, 2016, for "SYSTEMS AND METHODS FOR INCREMENTAL MULTI-INSTANCE LEARNING-BASED CLASSIFICATION FOR STREAMING INPUTS."

TECHNICAL FIELD

The present disclosure relates generally to wireless communications. More specifically, the present disclosure relates to incremental multi-instance learning (MIL)-based classification for streaming inputs.

BACKGROUND

Advances in technology have resulted in smaller and more powerful personal computing devices. For example, there currently exists a variety of portable personal computing devices, including wireless computing devices, such as portable wireless telephones, personal digital assistants (PDAs) and paging devices that are each small, lightweight and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs.

An electronic device may perform classification of information using multi-instance learning (MIL) techniques. In MIL, an electronic device may receive a bag that contains multiple instances. For example, in the context of web security, an electronic device may receive a webpage (i.e., bag) that contains multiple JavaScript blocks (i.e., instances). The electronic device may classify the bag by running a MIL model using features extracted from the instances.

In the case of a streaming input, not all of the instances may be present. However, the electronic device may need to classify the streaming input before all of the instances are available. For example, an electronic device may need to determine whether a webpage is benign or malicious before allowing the webpage to load, which means before it has received and executed many of the JavaScript blocks (instances) for the webpage (bag). Since a classification decision needs to be made before receiving all the instances, an incremental MIL-based classification mechanism, which effectively works with a minimal number of partial instances for a bag is beneficial, with the instances gradually streaming into the classification model.

SUMMARY

A method for multi-instance learning (MIL)-based classification of a streaming input is described. The method includes running a first biased MIL model using extracted features from a subset of instances received in the streaming input to obtain a first classification result. The method also includes running a second biased MIL model using the extracted features to obtain a second classification result. The first biased MIL model is biased opposite the second biased MIL model. The method further includes classifying the streaming input based on the classification results of the first biased MIL model and the second biased MIL model.

The first biased MIL model and the second biased MIL model may each be biased towards opposite binary classification types. The first biased MIL model may be generated using a first training set that is biased toward a first classification and the second biased MIL model may be generated using a second training set that is biased toward a second classification.

When the classification results of the first biased MIL model and the second biased MIL model indicate a same classification for the streaming input, then the classification of the streaming input may be considered accurate. When the classification results of the first biased MIL model and the second biased MIL model indicate a different classification for the streaming input, then the classification of the streaming input may be considered inaccurate.

The method may also include running an unbiased MIL model using the extracted features. The streaming input may be classified based on a classification result of the unbiased MIL model.

The method may also include obtaining one or more additional instances of the streaming input. The first biased MIL model and the second biased MIL model may be run using extracted features from the additional instances of the streaming input to obtain additional classification results. The streaming input may be classified based on the additional classification results of the first biased MIL model and the second biased MIL model.

The method may also include updating the first biased MIL model and the second biased MIL model based on the classification results.

The streaming input may include a webpage and the instances may include JavaScript blocks within the webpage. A partial subset of JavaScript blocks in the webpage may be used to run the first biased MIL model and the second biased MIL model to classify the webpage as either benign or malicious.

The first biased MIL model may be biased toward a benign classification for the webpage and the second biased MIL model may be biased toward a malicious classification for the webpage. The webpage may be allowed to load when both the first biased MIL model and the second biased MIL model indicate that the webpage is benign. The webpage may be prevented from loading when both the first biased MIL model and the second biased MIL model indicate that the webpage is malicious.

The method may also include performing higher order classification of the streaming input beyond binary classification. Performing the higher order classification may include running a plurality MIL model sets using the extracted features. A MIL model set may include two MIL models each biased towards two opposite binary classification types. Classification results of the plurality MIL model sets may be combined to obtain a final classification.

Performing the higher order classification may include running three or more biased MIL models that are each biased towards a particular classification using the extracted features. Classification results from the three or more biased MIL models may be combined. A final classification may be determined when a majority of the biased MIL models indicate the same classification result. The final classification may be deemed strong and finalized. If there is no single majority of the biased MIL models that produce the same classification result, the final classification may be obtained by choosing a highest frequency classification result.

An electronic device configured for MIL-based classification of a streaming input is also described. The electronic device includes a memory and a processor in communication with the memory. The processor is configured to run a first biased MIL model using extracted features from a subset of instances received in the streaming input to obtain a first classification result. The processor is also configured to run a second biased MIL model using the extracted features to obtain a second classification result. The first biased MIL model is biased opposite the second biased MIL model. The processor is further configured to classify the streaming input based on the classification results of the first biased MIL model and the second biased MIL model.

A non-transitory tangible computer readable medium for MIL-based classification of a streaming input is also described. The computer readable medium stores code for causing an electronic device to run a first biased MIL model using extracted features from a subset of instances received in the streaming input to obtain a first classification result. The computer readable medium also stores code for causing the electronic device to run a second biased MIL model using the extracted features to obtain a second classification result. The first biased MIL model is biased opposite the second biased MIL model. The computer readable medium further stores code for causing the electronic device to classify the streaming input based on the classification results of the first biased MIL model and the second biased MIL model.

An apparatus for MIL-based classification for a streaming input is also described. The apparatus includes means for running a first biased MIL model using extracted features from a subset of instances received in the streaming input to obtain a first classification result. The apparatus also includes means for running a second biased MIL model using the extracted features to obtain a second classification result. The first biased MIL model is biased opposite the second biased MIL model. The apparatus further includes means for classifying the streaming input based on the classification results of the first biased MIL model and the second biased MIL model.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from what is shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
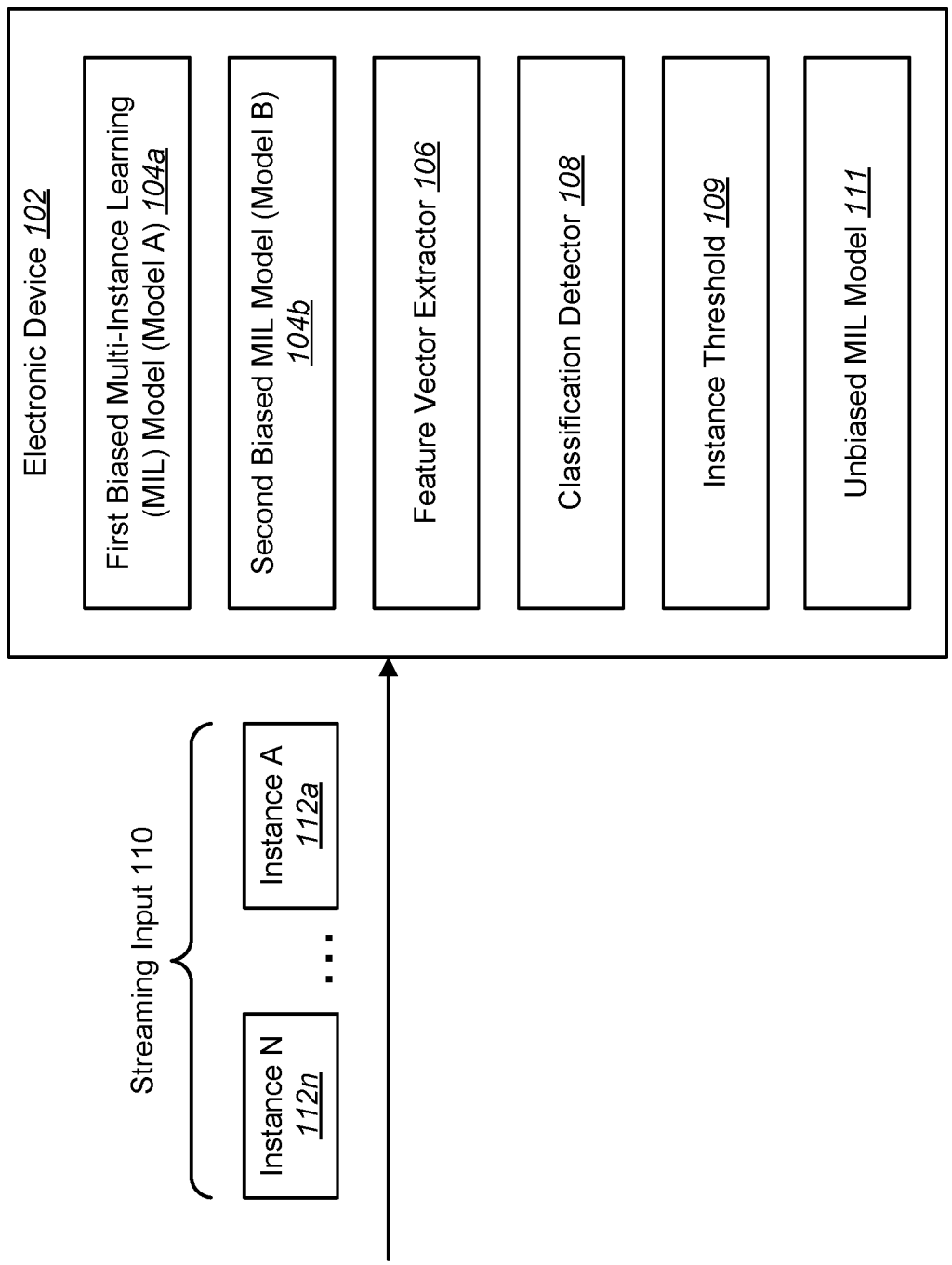
FIG. 1 is a block diagram illustrating one configuration of an electronic device configured for incremental multi-instance learning (MIL)-based classification of a streaming input.

FIG. 1 is a block diagram illustrating one configuration of an electronic device 102 configured for incremental multi-instance learning (MIL)-based classification of a streaming input 110. The electronic device 102 may also be referred to as a computing device, wireless communication device, mobile device, mobile station, subscriber station, client, client station, user equipment (UE), remote station, access terminal, mobile terminal, terminal, user terminal, subscriber unit, etc. Examples of electronic devices 102 include desktop computers, laptop computers, cellular phones, smartphones, e-readers, tablet devices, gaming systems, cameras, etc. Some of these devices may operate in accordance with one or more industry standards.

In computer science, machine learning is a field of study where a computer has the ability to learn without explicit programming. Multi-instance learning (MIL) (also referred to as multiple-instance learning) is a type of machine learning. In particular, MIL is a variation of supervised learning where an electronic device 102 may infer a classification result based on labeled training data. For example, in MIL operation, an electronic device 102 may receive a set of labeled bags, each containing many unlabeled instances 112, as opposed to receiving a set of instances 112 that are individually labeled.

MIL may be used to perform multiple-instance binary classification, where a bag is classified into one of two groups based on a classification rule. One example of a classification rule is a benign/malicious distinction. For example, a bag may be classified as benign if all the instances 112 in it are benign. On the other hand, a bag may be classified as malicious if there is at least one instance 112 in it that is malicious. Other types of classifications may be made.

An example application of MIL includes image classification. Given an image, an electronic device 102 may classify the image based on its visual content. For example, the classification might be "desert", where the image contains both "sand" and "sky". The image may be described as a bag (X). The image may be partitioned into multiple regions. Therefore, the bag (X) may include multiple instances 112 (e.g., a region of the image). A feature X(i) may be extracted from the corresponding region (i) in the image. The bag may be described as a feature vector (i.e., $X=\{X(1), X(2), \ldots, X(N)\}$, where N is the total instances 112 (regions) of the image). The bag may be classified as "desert" if it contains both "sand" region instances 112 and "sky" region instances 112.

In the above example, the classification is done after the entire image is available, hence all the instances 112 are present. However, in many other cases, the inputs are gradually arriving but classification needs to be done with time constraints even before all the instances 112 are available. This is the case for a streaming input 110.

Multi-instance learning (MIL) differs from other types of machine learning. In particular, MIL differs from multiclass classification in which instances 112 are classified into more than two classes.

As used herein, a streaming input 110 is a set of data that gradually arrives at the electronic device 102 over a period of time. The streaming input 110 is made up of a number of sub-units, referred to herein as instances 112. Each instance 112 is a part of the streaming input 110. The streaming input 110 may be regarded as a bag or container that contains the instances 112. The electronic device 102 may receive a series of instances 112 over a period of time. For example, the electronic device 102 may receive a first instance 112, followed by a second instance 112, and so on. In the example shown in FIG. 1, a first instance-A 112a is received at the electronic device 102 followed by a number of instances 112 until a last instance-N 112n. Therefore, as used herein, the term "multi-instance" refers to the data sample of the streaming input 110.

In an example, when detecting malicious webpages due to the presence of malicious JavaScripts (JS) in the webpage, the JavaScripts are the instances 112. In this case, the JavaScripts may be received as streaming input 110 from a remote device (e.g., web server). Benefits may be realized by classifying the streaming input 110 based on a partial sample set of the instances 112a-n.

In the case of some streaming inputs 110, there exists a paradoxical situation. For example, in the case of a webpage, JavaScript resources may be considered as instances 112 of the webpage. However, JavaScript resources in the webpage cannot be executed (for safety purposes) until the webpage is deemed benign. Yet, until all the JavaScript resources are received, the classification for benign/malicious cannot be made using a traditional approach. This can result in large delays for webpage loading. At its worst, this approach results in a deadlock scenario since in many cases webpage loading cannot proceed without executing some of the JavaScript codes. Therefore, there exists a challenge in MIL classification for streaming inputs 110.

The systems and methods described herein provide mechanisms for effective use of MIL models 104 for accurate classification with low false positives in use cases where all the instances 112 of the bag are not present during classification. In other words, the instances 112 may be arriving gradually one by one, but the classification step cannot wait for all the instances 112 to arrive.

It should be noted that the systems and methods described herein are explained using an example application of web security. In particular, the systems and methods describe MIL for classifying malicious webpages from gradually received JavaScript blocks (also referred to as code snippets). However, the systems and methods described herein may be applied to other applications that employ MIL classification on a streaming input 110.

In the context of MIL for classifying malicious webpages from gradually received JavaScript, there may be two steps. A first step may include training to create MIL models 104. A second step may include detection (e.g., classification) using the MIL models 104. The first step that creates the MIL models 104 may be done offline on a host machine that may be different from the actual electronic device 102 running the MIL models 104. In this situation, the MIL models 104 may be installed in the electronic device 102 during the application download, or imaging/re-imaging the software in the electronic device 102, or over-the-air uploaded, or any other means of installing software/application on a device.

In other cases where real time update of the MIL models 104 may be done in the electronic device 102, a first step of performing the training and model generation may be also done on the electronic device 102 that is also doing the second step (detection/classification) using the generated MIL models 104. These are however implementation choices.

A webpage may be considered a "bag" that includes a collection of elements that are the unlabeled instances 112. In an implementation, the instances 112 in a webpage may be JavaScript blocks. The JavaScript blocks may be enclosed by a <script></script> tag or may be dynamically generated. It should be noted that other webpage elements (e.g., Cascading Style Sheets (CSS), HyperText Markup Language (HTML) elements, etc.) may be instances 112 of a streaming input 110 that are used to perform MIL-based classification of a webpage as described herein.

For training sets that are used to generate a model offline, all that may be known about a bag is that the bag is labeled malicious (1) or benign (0). A bag is benign if all the instances 112 are benign. A bag is malicious if there is at least one instance 112 that is malicious, but it is not known if any specific instance 112 in the training set is malicious or benign. Examples of a malicious bag and a benign bag are described in connection with FIG. 3.

Each instance 112 (i.e., JS block) may be described by a vector of features. For example, JS features may include various parameters, statistics and profiles extracted by parsing the JavaScript code block. These extracted JS features may include (i) the length of the JavaScript block, (ii) number of characters in the largest string, (iii) the number of strings used, (iv) the number of eval( ) functions, (v) the number of document.write( ) functions, (vi) the number of various string manipulation functions, etc. In this example, these different features, described from (i) through (vi), will form an example vector with six elements, where each element represents a particular feature and contains its value. It should be noted that other features may be extracted.

As an example, if the length of the JavaScript block is 4096 bytes, the first element of the feature vector will be the value 4096. If the number of eval( ) functions in the given JavaScript block is 9, the fourth element in the feature vector will be the value 9.

The offline training and model generation phase works with these feature vectors created from the multiple instances 112 of the tagged bags (i.e., bags which are known as either benign or malicious). Based on the label of the bag, the classifier biased MIL models 104 are created.

During the on-device real-time detection, the generated classifier biased MIL models 104 work with feature vectors that are dynamically created from the gradually received streaming instances 112 of JavaScript blocks. Based on these on-device real-time generated feature vectors, the classifier models 104 determine if the webpage being browsed/loaded (i.e., the bag) is benign or malicious (i.e., the tag of the bag).

During on-device real-time detection, MIL models 104 may attempt to predict the label of an unknown bag by extracting the features from the received instances 112 (JavaScript) in the bag. In the case of a webpage, whenever a new webpage is being loaded, the MIL models 104 may be engaged to predict if it is malicious or benign. If it is benign, it is safe to load the page.

Figure 4:
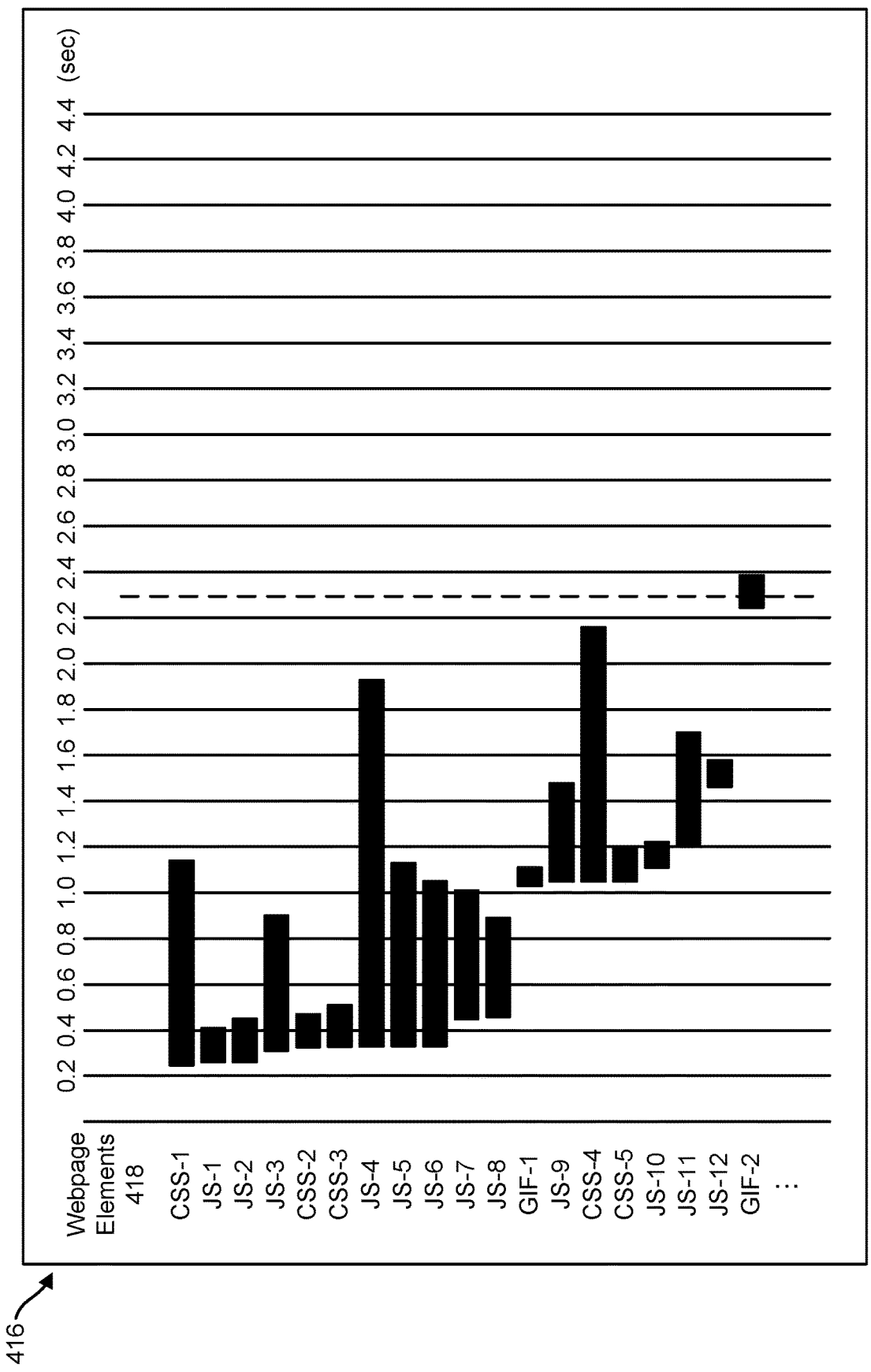
FIG. 4 illustrates an example of a webpage loading timing diagram.

However, malicious/benign webpage classification needs to be real-time during page loading while new JavaScript blocks are still gradually being received (streamed) from the web server. An example webpage loading timing diagram in FIG. 4 shows how JavaScript resources are gradually received. As observed in this example, the challenge is that unless all JavaScript resources are received, the MIL detection will be inaccurate using traditional approaches and JavaScript code cannot be allowed to execute. But page loading cannot progress to get newer JavaScript resources until the received JavaScripts are executed.

To address this challenge, the systems and methods described herein provide an approach for effective use of MIL models 104 for accurate classification with low false positives in cases where all the instances 112 of the bag are not available during classification. The instances 112 may be gradually received by the electronic device 102 and the classification step may occur without waiting for all the instances 112 to arrive.

Some key aspects of this approach include a unique combination of two different MIL models 104 (referred to herein as models A 104a and B 104b). The two MIL models 104 may be generated with training sets with bias towards two different (and opposite) classifications. In other words, the MIL models 104 may be biased towards two opposite binary classifications types. This can yield very accurate classification for inputs that are actually of the bias category even using a small partial sub-set of instances 112. For example, just three instances 112 out of a total ten instances 112 for the bag may be used to classify the streaming input 110. An example of model generation is described in connection with FIG. 6.

In an example, a first biased classification MIL model (model A) 104a and a second biased classification MIL model (model B 104b) may be used for malicious webpage (bag) detection. Model A 104a and model B 104b may be generated using multiple JavaScript (instances 112) in the training sets. The training sets may include a combination of known benign and malicious webpages (bags). In an implementation, benign webpages may be used predominantly for model A 104a. For example, in the training set for model A 104a, the ratio of benign sites to malicious sites may be 5:1 (although other ratios may be used). In other words, the training set for model A 104a may include many more benign instances 112 than malicious instances 112. In this case, the bias is towards benign classification, with "0" indicating benign.

Malicious webpages may be used predominantly for model B 104b. For example, in the training set for model B 104b, the ratio of benign sites to malicious sites may be 1:5. In other words, the training set for model B 104b may include many more malicious instances 112 than benign instances 112. In this case, the bias is towards malicious classification, with "1" indicating malicious.

During on-device real-time detection, the first biased MIL model A 104a and second biased MIL model B 104b may classify a bag (e.g., webpage) as shown in Table 1. This classification may be made based on a partial subset of instances 112 in the streaming input 110.

TABLE 1

| MIL Model Type | Classification Results | | | |
| --- | --- | --- | --- | --- |
|  | Strong Bias '0' | Strong Bias '1' | Strong Conflict | Weak Conflict |
| Model A (Bias '0') | 0 | 1 | 0 | 1 |
| Model B (Bias '1') | 0 | 1 | 1 | 0 |

As observed in Table 1, when both the two MIL models 104 (i.e., model A 104a and model B 104b) with opposite bias classify a webpage with the same outcome, this implies that the prediction is very accurate for the partial subset of instances 112 that were used. For example, if both model A 104a and model B 104b classify a web site as benign (Strong Bias '0' column in Table 1) or malicious (Strong bias '1' column in Table 1), then that prediction may be considered very accurate.

If the two MIL models 104 provide different outcomes that are directly correlated with their bias (i.e., strong conflict), then the given subset of instances 112 (i.e., sample data/input) is on the edge-case. If the two MIL models 104 provide different outcomes and are inversely correlated with their bias (i.e., weak conflict), then the characteristics of the MIL models 104 may not have covered the uniqueness (or unknown issues) in the given sample data/input.

The model A 104a and model B 104b, being biased for the two opposite classification types, are able to perform accurate detection for the category they are biased for even with a small subset of instances 112 (e.g., 3) from a bag of multiple instances 112 (e.g., total 10). This enables the electronic device 102 to perform accurate classification for streaming (i.e., gradually arriving) inputs/instances 112 without waiting for all the instances 112 to arrive.

In this approach, the confidence level of the classification is determined by the classification results from the two biased MIL models 104. Therefore, if both the benign biased MIL model 104a and the malicious biased MIL model 104b indicate that an instance 112 is malicious, then there is a high confidence that this instance 112 is malicious. If both biased MIL models 104 indicate that an instance 112 is benign, then there is a high confidence that this instance 112 is benign.

The classification using both model A 104a and model B 104b may be run for the first time upon receiving enough instances 112 for which the biased models 104 are sufficiently accurate. The electronic device 102 may be configured with a threshold number of instances 112 (referred to herein as an instance threshold 109). When the electronic device 102 receives a number of instances 112 that meets or exceeds the instance threshold 109, classification may be performed. For example, once three instances 112 are received, both model A 104a and model B 104b can be run.

In an implementation, the electronic device 102 may include a feature vector extractor 106 and a classification detector 108. The feature vector extractor 106 may extract feature vectors from the received instances 112 (e.g., JavaScript code). For example, the feature vector extractor 106 may parse the JS code to obtain certain parameters, statistics and profiles, as described above.

The classification detector 108 may then apply the extracted feature vectors to model A 104a (i.e., Bias-0) to determine a classification (e.g., 0 or 1) for the subset of instances 112. The classification detector 108 may also apply the extracted feature vectors to model B 104b (i.e., Bias-1) to determine a classification (e.g., 0 or 1) for the subset of instances 112. The classification detector 108 may run the two biased MIL models 104a-b simultaneously. The classification detector 108 may run the two biased MIL models 104a-b when the number of instances 112 received reaches or surpasses the instance threshold 109.

The classification detector 108 may compare the classification results of the two MIL models 104 to determine a final classification for the streaming input 110 (e.g., "strong-bias-0, strong-bias-1, strong conflict, weak conflict). Examples illustrating web security classification using two opposite bias MIL models 104 are described in connection with FIGS. 8 and 9.

For a classification resulting in "strong-bias-0" or "strong-bias-1", the electronic device 102 can make progress or decide on the final action. For example, webpage loading can continue if the final classification gives "strong-bias-0" (i.e., benign). If the classification result is "strong-bias-1" (i.e., malicious), then loading the particular webpage is immediately abandoned without obtaining any further JavaScript resources (i.e., instances 112 of the bag).

In a webpage loading case, the electronic device 102 need not wait for all the JavaScript code to arrive from the web server. As an example, the electronic device 102 can start classification after the instance threshold 109 has been met. For example, the electronic device 102 may classify the webpage as benign or malicious after the first three instances 112 out of N instances 112 have arrived. Note that the value "three" is an example. The instance threshold 109 may be different based on implementations and the nature of the two opposite biased models 104, the nature of the training sets, and the level of accuracy and the limits on false alarms required in a particular implementation of the fundamental mechanism of this disclosure. Additionally, the instance threshold 109 for detection may be dynamically increased if an earlier value does not provide conclusive results.

In an implementation, after the initial classification runs, the MIL models 104 can be rerun as a new instance 112 arrives. This leads to incremental classification/detection. For example, in the webpage loading case, the electronic device 102 can re-run the classification as each new JavaScript code arrives from the web server.

Table 2 illustrates sample results of the described systems and methods. The graphs of FIG. 5 highlight misprediction rates and the impact of using two opposite biased MIL models 104.

TABLE 2

| | Benign Webpages | | | Malicious Webpages | | |
|---|---|---|---|---|---|---|
| Number of JS Instances | Reasonable Bias Model | Model Data Biased towards Benign | Model Data Biased towards Malicious | Reasonable Bias Model | Model Data Biased towards Benign | Model Data Biased towards Malicious |
| 1 | 1.5% | 0.4% | 21.6% | 2.3% | 9.7% | 0.8% |
| 3 | 0.8% | 0.2% | 16.8% | 2.5% | 10.0% | 0.7% |
| 5 | 0.6% | 0.2% | 12.9% | 2.5% | 9.8% | 0.7% |
| 9 | 0.4% | 0.2% | 10.6% | 2.6% | 10.4% | 0.7% |

Based on measurements, 90% of web sites give strong bias (e.g., 0 or 1) results using the two oppositely biased MIL models 104, where both the classification results conclude either benign or malicious. If the strong bias indicates malicious, loading the webpage may be immediately abandoned. If the strong bias indicates benign, page loading continues and the two opposite biased models 104 (i.e., model A 104a and model B 104b) are re-run whenever one or more new JavaScript resources arrive. The granularity of re-running is left to the implementation.

The remaining 10% of the webpages are mostly "strong conflicts" with few "weak conflicts". There are some options to handle these "conflict" cases described herein. In a first option, the electronic device 102 may run an unbiased MIL model 111 to see the classification result. The electronic device 102 may use the classification result from the unbiased MIL model 111 as a guidance to proceed.

It should be noted that the unbiased MIL model 111 is constructed differently than the biased MIL models 104. In an implementation, the unbiased MIL model 111 may be generated using an unbiased training set. For example, the unbiased training set may include approximately the same number of benign instances 112 and malicious instances 112. The unbiased MIL model 111 may act as the tie-breaker in case the biased MIL models 104 conflict.

In a second option, the electronic device 102 may wait for more JavaScript resources (i.e., instances 112 of the bag in terms of MIL) to arrive. Upon receiving one or more JavaScript resources, the electronic device 102 may extract the new feature vectors from the newly received JavaScript blocks and then run both the biased-model set (i.e., model A 104a and model B 104b) and/or the unbiased MIL model 111 using the extracted feature vectors from the newly received additional JavaScript resources.

The described approach may be applied for other classes of problems, not just web security. For example, when images are streamed, each part of the image may be received part by part. These parts of the image file may be considered an instance 112 while the whole image is the bag as per the multi-instance learning models 104.

Classification of the image may be made based on a subset of the image. For example, this approach may be applied to determine if the picture is of a "sea beach" or "not a sea beach". Here, "sand" and "water" may be the features in the feature vector that is created for each instance 112 (the subparts of the image). The two opposite biased classification models A 104a and B 104b are such that model A 104a is biased towards "sea beach" and model B 104b is biased towards "not a sea beach". Even when the image is not streamed, but say a partial image is received due to the fact that rest of the image is corrupted and data is not available, then this mechanism can be used for automatic determination.

In addition to the binary classification described above, the described approach may also be extended for higher order (e.g., tertiary, quaternary, etc.) classifications by generating biased models 104 for each different classification type (either in one shot, or by doing two or more at a time), rather than just binary classifications. In the example with the image, detecting "beach", "rain", "desert" or "other" classifications may be accomplished by identifying the presence of (i) "sand" and "water" for beach, (ii) "water" and "sky" for rain, (iii) "sky" and "sand" for desert, (iv) else others from the multiple instances 112 (the various sections of an image) for the entire bag (the full image).

The classification results of higher order classification can be obtained by running a plurality of MIL model sets using the extracted features. A MIL model set may include two MIL models 104 each biased towards two different classification types. The classification results of the plurality MIL model sets may be combined to obtain a final classification.

Alternatively, all the different biased classification models 104 with each biased towards a particular classification are run one by one using the extracted features and a combined classification is obtained from all the resulting classification results. In this case, the final classification can be obtained when a majority (e.g., greater than half) of the biased classification models 104 indicate the same classification result. Then, the classification is deemed strong and finalized. If there is no single majority, an implementation can decide the final classification by choosing the highest frequency classification result. Table 3 provides an example of higher order classification using biased MIL models 104.

Most of the current work on multi-instance learning (MIL) is geared towards instances 112 that are not necessarily independent. Earlier work on MIL considered all independent instances 112. However, no work has been found to focus on multi-instance learning (MIL) with respect to the availability of a partial set of instances 112 for a bag. The unique nature of the problem (e.g., for determining the malicious/benign nature of the webpage being loaded, the instances 112 are gradually arriving but with the need to determine malicious/benign upfront even with the reception of all the instances 112) will benefit from MIL where detection uses a partial or incomplete instance 112 set for a bag.

The current industry trend on browser security is moving from the black/white list based approach to a more intelligent machine learning based approach. The described systems and methods further advance this approach to provide an effective and practical working solution with a focus on minimal user experience degradation, good accuracy, and low false alarms. This is especially important for a streaming input 110 where decisions should be made on a partial set of received instances 112.

This approach uses a single machine learning classifier algorithm (i.e., multi-instance learning) to create multiple biased MIL models 104 that are obtained by using different input combinations for the different models generated by the same classifier algorithm. This classification approach is used for binary class problems (i.e., a classification of two labels), though this approach can be extended to more than two labels by using more than two input combinations for generating the biased MIL models 104, as described above.

During training, two different specifically biased input data sets are sent to a classifier to create two different MIL models 104 that simultaneously determine the confidence (or the stability) of the predictions. Also, when the two biased MIL models 104 do not provide the same classification result, other implementations may be employed to adaptively delay classification result acceptance in the context of streaming data inputs 110. These implementations include increasing the instance threshold 109 for more instances 112 from the partial set of instances for a bag or using an unbiased MIL model 111 in combination with the classification results of the biased MIL models 104a-b.

TABLE 3

| Model Type | Classification Results are Strong Bias '0' | Classification Results are Strong Bias '1' | ... | Classification Results are Strong Bias 'N' | Classification Results are Strong Conflict | Classification Results are Weak Conflict |
|---|---|---|---|---|---|---|
| Model-Bias '0' Model-Bias '1' ... Model-Bias 'N' | If N/2 or more biased models indicate '0' OR '0' is the highest frequency of all results | If N/2 or more biased models indicate '1' OR '1' is the highest frequency of all results | ... | If N/2 or more biased models indicate 'N' OR 'N' is the highest frequency of all results | Most of the models gave results that are the same as each one's bias | Most of the models gave results that are different than each one's bias |

In another implementation, the electronic device 102 may perform on-device biased modeling with continuous training and updating the biased MIL models 104 by using the current classification results of the real time classification. The strong biased results may be used to further strengthen the respective biased MIL models 104. The conflict results (e.g., weak and strong) may be used to strengthen the biased MIL models 104 with respect to unique cases or may be used to create new models that can effectively handle the "conflict" cases when the decision for them is ultimately made after more instances 112 are received.

Figure 2:
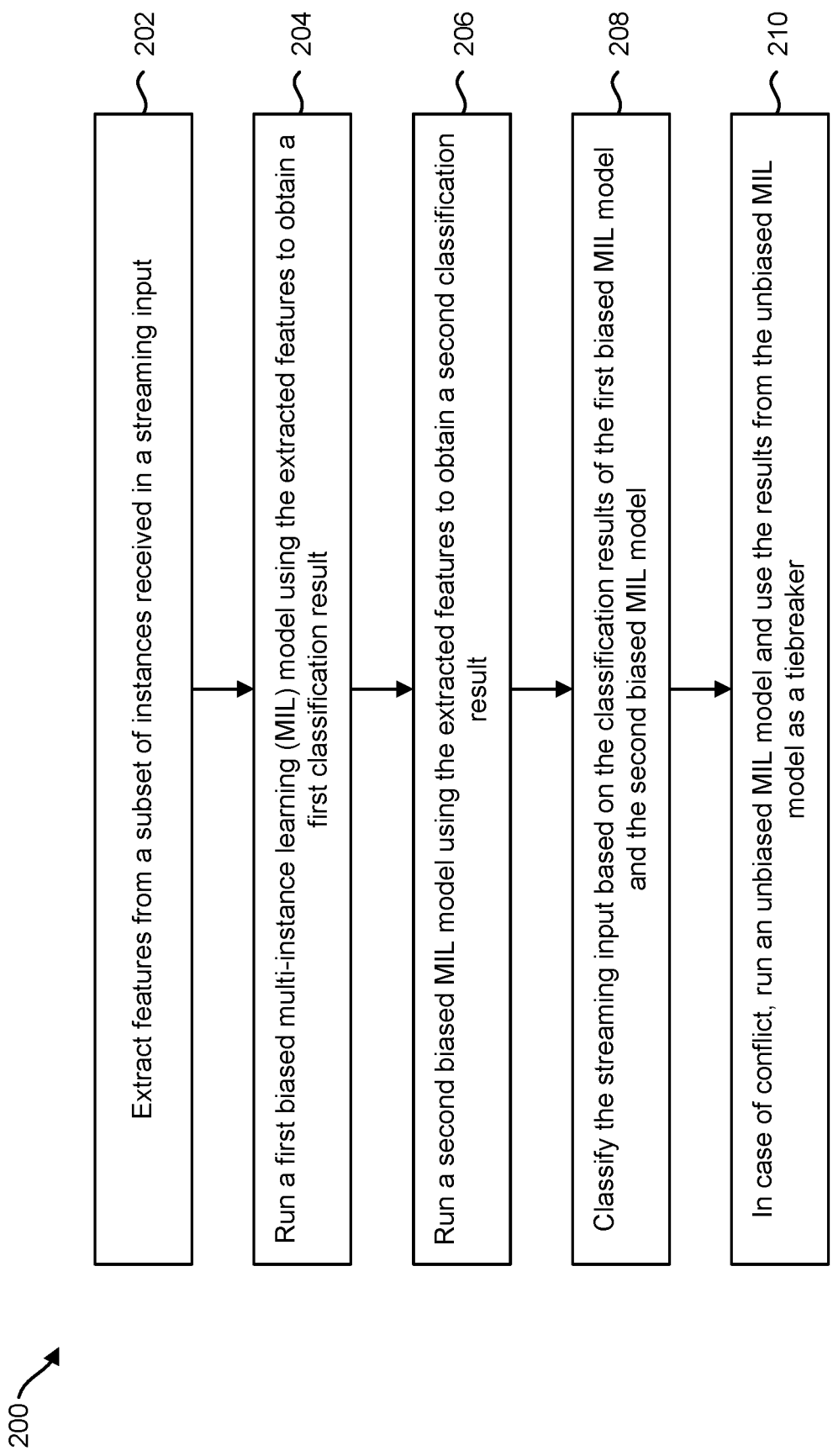
FIG. 2 is a flow diagram illustrating a method for MIL-based classification of a streaming input.

FIG. 2 is a flow diagram illustrating a method 200 for multi-instance learning (MIL)-based classification of a streaming input 110. The method 200 may be performed by an electronic device 102. The electronic device 102 may receive a partial subset of instances 112 in a streaming input 110. For example, the streaming input 110 may be a webpage and the electronic device 102 may receive a partial subset of JavaScript (JS) blocks in the webpage.

The electronic device 102 may extract 202 features from the subset of instances 112 received in the streaming input 110. Each instance 112 (i.e., JS block) may be described by a vector of features. JS features may include various parameters, statistics and profiles extracted by parsing the JavaScript code block. For example, JS features may include (i) the length of the JavaScript blockscript, (ii) number of characters in the largest string, (iii) the number of strings used, (iv) the number (#) of eval( ) functions, (v) the number of document.write( ) functions, (vi) and the number of various string manipulation functions, etc.

The electronic device 102 may run 204 a first biased MIL model (model A) 104a using the extracted features to obtain a first classification result. The result of running 204 the first biased MIL model 104a may be a first classification of the streaming input 110.

The electronic device 102 may run 206 a second biased MIL model (model B) 104b using the extracted features to obtain a second classification result. The result of running 206 the second biased MIL model 104b may be a second classification of the streaming input 110.

The first biased MIL model 104a may be biased opposite the second biased MIL model 104b. For example, the first biased MIL model 104a and the second biased MIL model 104b may be biased towards two opposite binary classification types. The electronic device 102 may run 204 the first biased MIL model 104a and may run 206 the second biased MIL model 104b simultaneously.

The first biased MIL model 104a may be generated using a first training set that is biased toward a first classification. The second biased MIL model 104b may be generated using a second training set that is biased toward a second classification. For example, the first biased MIL model 104a may be biased toward a benign classification for a webpage and the second biased MIL model 104b may be biased toward a malicious classification for the webpage.

The electronic device 102 may classify 208 the streaming input 110 based on the classification results of the first biased MIL model 104a and the second biased MIL model 104b. For example, when the classification results of the first biased MIL model 104a and the second biased MIL model 104b indicate a same classification for the streaming input 110, then the classification of the streaming input 110 is considered accurate. In the case of a webpage classification, if both the first biased MIL model 104a and the second biased MIL model 104b indicate that the webpage is benign, then the webpage may be considered benign. If both the first biased MIL model 104a and the second biased MIL model 104b indicate that the webpage is malicious, then the webpage may be considered malicious.

When the classification results of the first biased MIL model and the second biased MIL model indicate a different classification for the streaming input 110, then the classification of the streaming input 110 is considered inaccurate. In the case of a webpage classification, if the first biased MIL model 104a indicates that the webpage is benign, but the second biased MIL model 104b indicates that the webpage is malicious, then the webpage classification may be considered inaccurate.

In one approach for handling classification conflicts, the electronic device 102 may run 210 an unbiased MIL model 111 using the extracted features. The electronic device 102 may then use the results from the unbiased MIL model 111 as a tiebreaker. For example, the electronic device 102 may classify the streaming input 110 based on a classification result of the unbiased MIL model.

In another approach, the electronic device 102 may obtain one or more additional instances 112 (e.g., JS blocks) of the streaming input 110. The electronic device 102 may run the first biased MIL model 104a and the second biased MIL model 104b using extracted features from the additional instances 112 of the streaming input 110 to obtain additional classification results. The electronic device 102 may classify the streaming input 110 based on the additional classification results of the first biased MIL model 104a and the second biased MIL model 104b.

In an implementation, a partial subset of JavaScript blocks in a webpage may be used to run the first biased MIL model 104a and the second biased MIL model 104b to classify the webpage as either benign or malicious. For example, when both the first biased MIL model 104a and the second biased MIL model 104b indicate that the webpage is benign, then the webpage may be allowed to load. When both the first biased MIL model 104a and the second biased MIL model 104b indicate that the webpage is malicious, then the webpage may be prevented from loading.

The electronic device 102 may update the first biased MIL model 104a and the second biased MIL model 104b based on the classification results. For example, strong biased results can be used to further strengthen the respective biased MIL models 104. Conflicting results (e.g., weak and strong) can be used to strengthen the biased MIL models 104 with respect to unique cases or create new models that can effectively handle the "conflict" cases when the decision for them is ultimately made after more instances 112 are received.

Figure 3:
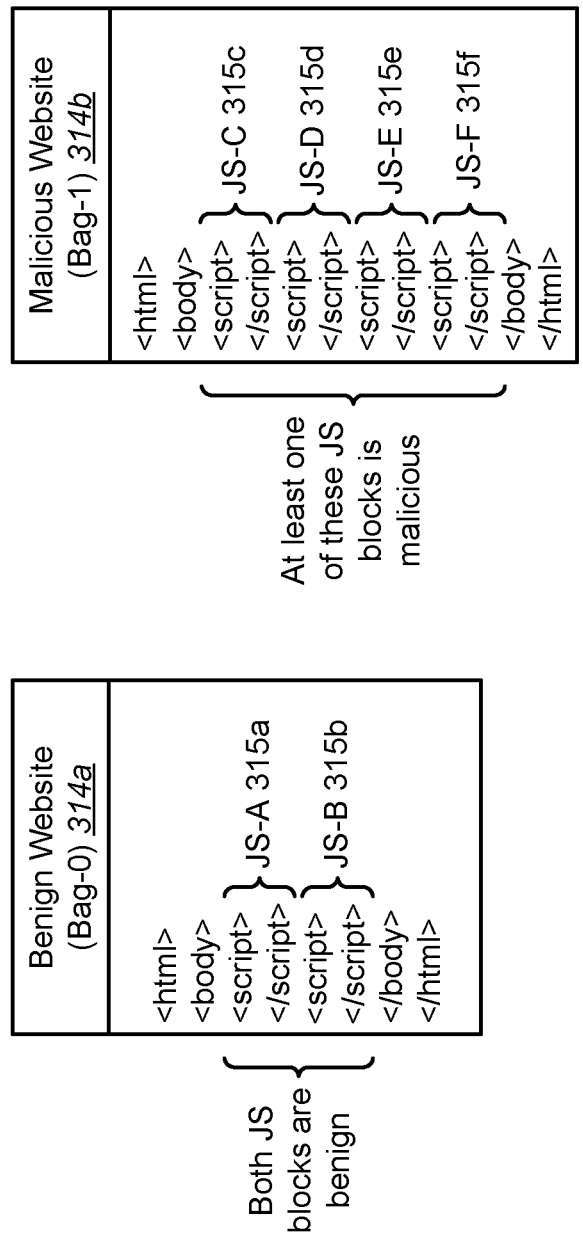
FIG. 3 illustrates an example of a benign webpage and a malicious webpage that may be used in MIL-based classification.

FIG. 3 illustrates an example of a benign webpage 314a and a malicious webpage 314b that may be used in MIL-based classification. In this example, a webpage 314 may be considered a bag. Therefore, the benign webpage 314a may be referred to as Bag-0 and the malicious webpage 314b may be referred to as Bag-1.

A webpage 314 may include a number of instances 112. In this case, the webpages 314a-b include a collection of JavaScript (JS) blocks 315. The JS blocks 315 are enclosed by a <script></script> tag.

In this case, the JS blocks 315 are the unlabeled instances 112. In other words, a specific classification of a JS block 315 as benign or malicious is not included.

The benign webpage 314a includes two JavaScript blocks 315a-b. Both of the JavaScript blocks 315a-b in the benign webpage 314a are benign.

The malicious webpage 314b includes four JavaScript blocks 315c-f. At least one of the JavaScript blocks 315c-f in the malicious webpage 314b is malicious. However, the individual JavaScript blocks 315c-f are unlabeled. In other words, it is unknown which JavaScript blocks 315c-f in the malicious webpage 314b are benign and which are malicious.

FIG. 4 illustrates an example of a webpage loading timing diagram 416. This example shows the order of different webpage elements 418 that make up a webpage 314 and the amount of time to load the webpage elements 418.

In this example, there are 17 webpage elements 418 (e.g., JavaScript blocks 315 and CSS files) that must load before visible body content (starting with GIF-2) appears.

Some or all of the webpage elements 418 may be considered instances 112 in the streaming input 110 of a webpage 314. For example, a subset of the JavaScript blocks 315 may be used to classify the webpage 314 as either benign or malicious, as described above.

Figure 5:
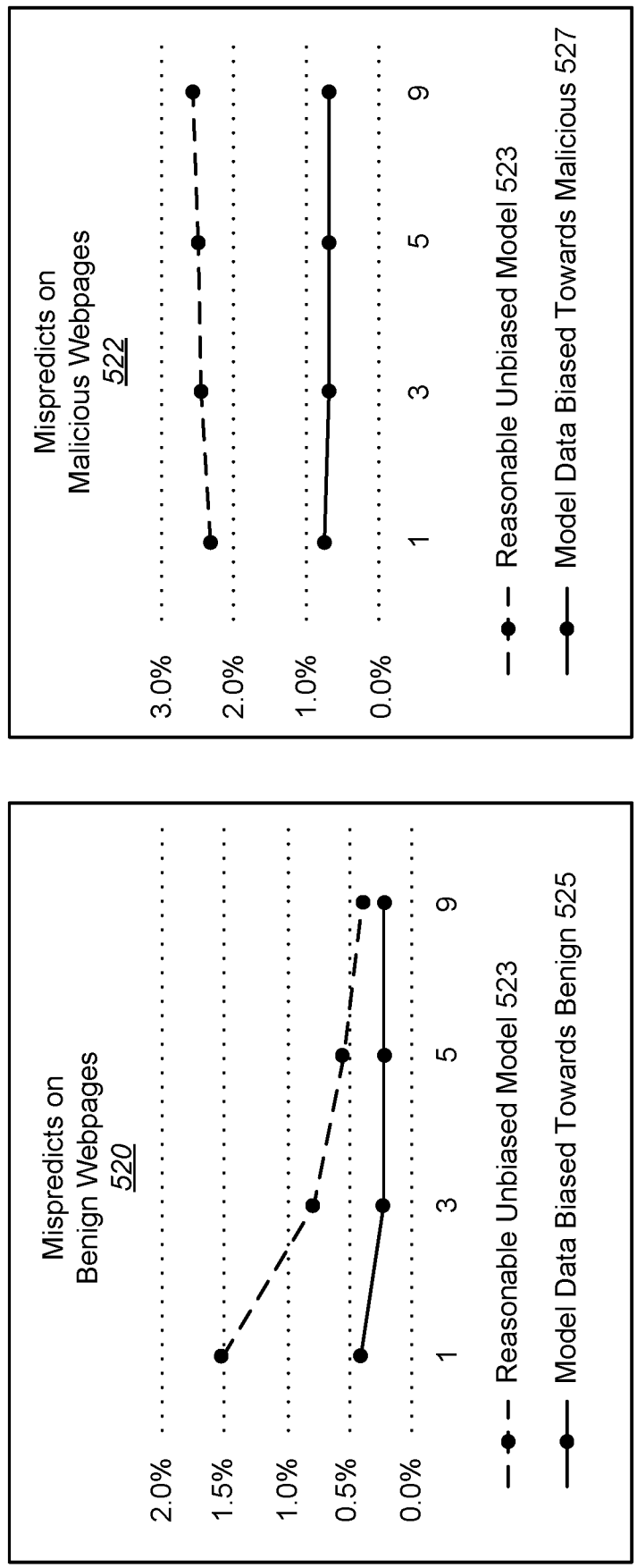
FIG. 5 illustrates trends in the misprediction rates associated with opposite biased MIL models compared to a reasonable unbiased model.

FIG. 5 illustrates trends in the misprediction rates associated with opposite biased MIL models 104 compared to a reasonable unbiased MIL model 111. In particular, FIG. 5 includes a graph 520 of mispredicts (i.e., incorrect predictions) on benign webpages 314a and a graph 522 of mispredicts on malicious webpages 314b.

The graph 520 for mispredicts on benign webpages 314a includes results 523 for a reasonable unbiased MIL model and results 525 for model data biased towards benign. The graph 522 for mispredicts on malicious webpages 314b includes results 523 for a reasonable unbiased MIL model 111 and results 527 for model data biased towards malicious.

As observed in both graphs 520, 522, there are fewer mispredicts early in page loading using the opposite biased MIL models 104. Also, it is observed in this example that 3 is a good value for the instance threshold 109 when the two opposite biased MIL models 104 are used. This value of the instance threshold 109 gives a conclusive strong bias result 90% of the time. However, it should be noted that other values of the instance threshold 109 may be configured.

Figure 6:
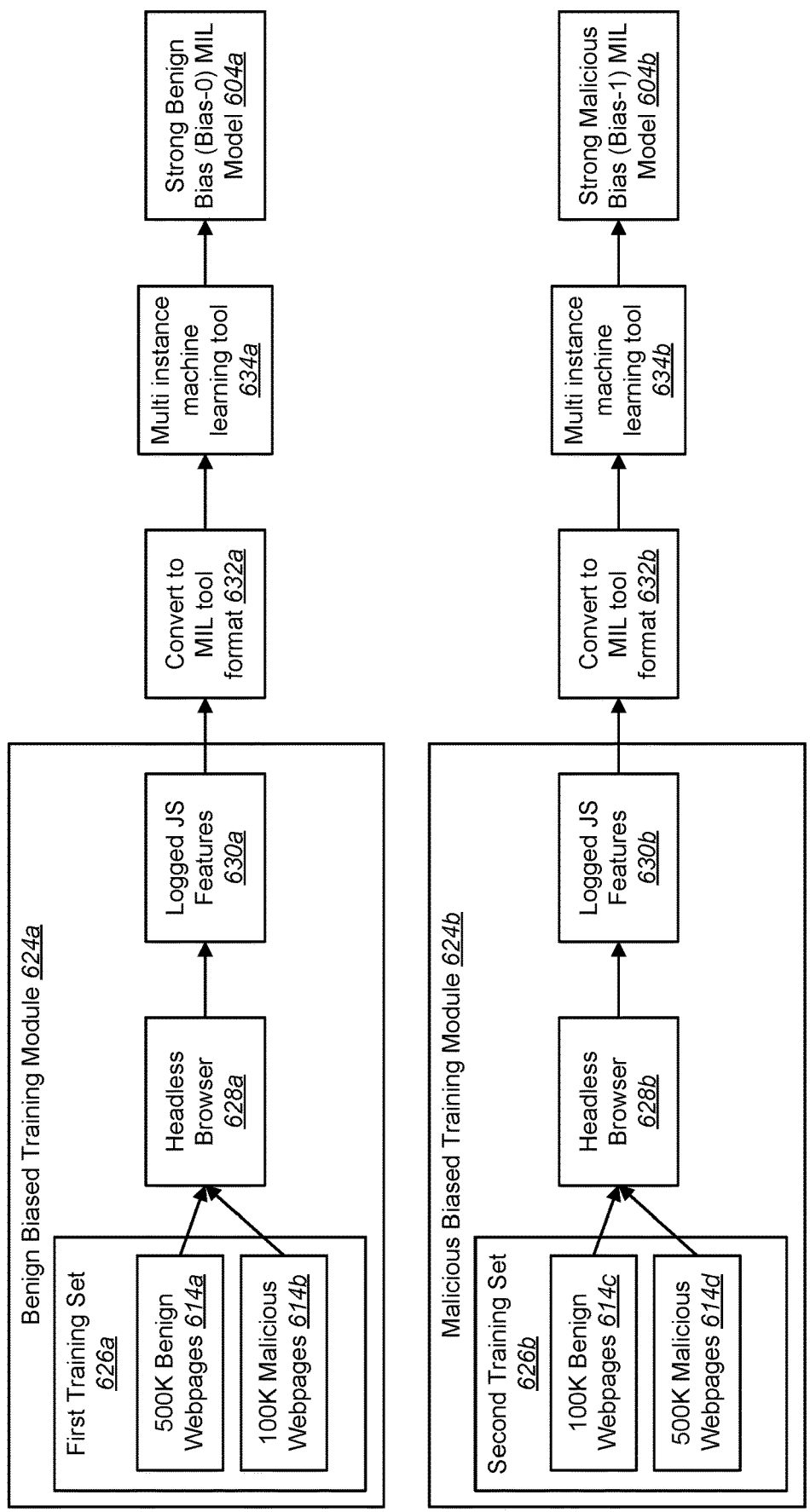
FIG. 6 is a block diagram illustrating one configuration of MIL model creation.

FIG. 6 is a block diagram illustrating one configuration of MIL model creation. This example produces biased MIL models 604 for a web security context.

Training sets 626 may contain a large number of complete webpages 614 with known tags as malicious or benign. These webpages 614 may be considered bags in the context of MIL-based classification. Each tagged bag (i.e., webpage 614) in the training set 626 has multiple instances 112 (e.g., JavaScript blocks 315), but the malicious/benign nature of the specific instances 112 (e.g., specific JavaScript blocks 315) are unknown.

A benign biased training module 624a may include a first training set 626a that is biased towards benign. In this example, the first training set 626a includes 500,000 benign webpages 614a and 100,000 malicious webpages 614b. Therefore, the ratio of benign webpages 614a to malicious webpages 614b in the first training set 626a is 5:1. The webpages 614 of the first training set 626a may be fed into a headless browser 628a that extracts the JavaScript features 630a. These JavaScript features 630a may be logged and converted to a MIL tool format 632a. It should be noted that the ratio of 5:1 and the number of benign webpages 614a and malicious webpages 614b used in the training and model generation is exemplary. An implementation can choose a different ratio and number of benign webpages 614a and malicious webpages 614b for training and model generation.

The converted JavaScript features 632a may be provided to a multi-instance machine learning tool 634a, which generates a strong benign bias (bias-0) MIL model 604a. This first biased MIL model 604a may be provided to an electronic device 102 to perform on-device MIL classification.

A malicious biased training module 624b may include a second training set 626b that is biased towards malicious. In this example, the second training set 626b includes 100,000 benign webpages 614c and 500,000 malicious webpages 614d. Therefore, the ratio of benign webpages 614c to malicious webpages 614d in the second training set 626b is 1:5. The webpages 614 of the second training set 626b may be fed into a headless browser 628b that extracts the JavaScript features 630b. These JavaScript features 630b may be logged and converted to a MIL tool format 632b. It should be noted that the ratio of 1:5 and the number of benign webpages 614a and malicious webpages 614b used in the training and model generation is exemplary. An implementation can choose a different ratio and number of benign webpages 614a and malicious webpages 614b for training and model generation.

The converted JavaScript features 632b may be provided to a multi-instance machine learning tool 634b, which generates a strong malicious bias (bias-1) MIL model 604b. This second biased MIL model 604b may be provided to an electronic device 102 to perform on-device MIL classification.

The biased MIL model generation may be done offline. Furthermore, the biased MIL model generation may be done on an electric device other than the electric device 102 described in connection with FIG. 1. The two strong biased MIL models 604a-b that are generated offline from the training sets 626a-b will be used in the actual target electronic device 102 for real-time detection of malicious webpages 314.

Figure 7:
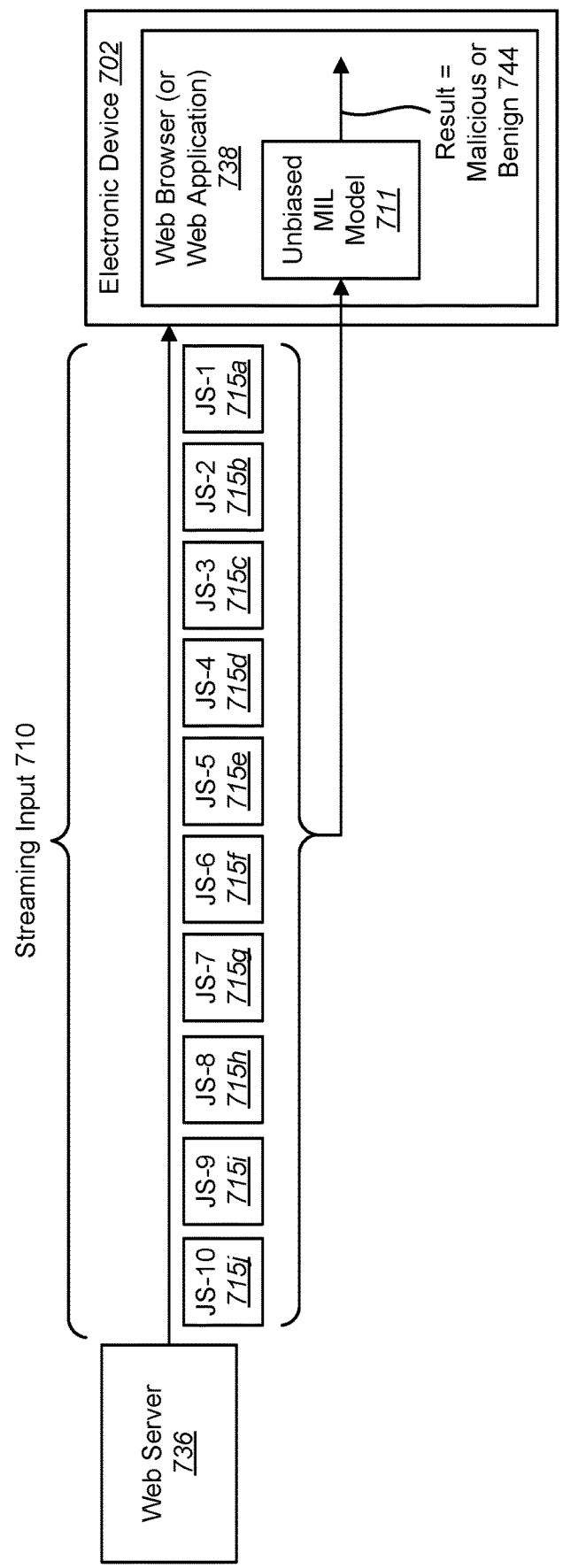
FIG. 7 illustrates an approach to MIL-based classification for streaming inputs.

FIG. 7 illustrates an approach to MIL-based classification for streaming inputs 710. This example includes a web server 736 and an electronic device 702. The electronic device 702 may include a web browser (or web application) 738.

The web server 736 may host one or more websites with one or more webpages 314. As used herein, a website is a collection of one or more webpages 314. Each webpage 314 may include multiple instances 112. For example, instances may be JavaScript blocks 715. The web server 736 may consider the particular webpage 314 (bag in MIL terminology) that it is hosting for sending to the electronic device 702 when requested by the client browser (or Web application) running on the electronic device 702 and can stream a plurality of JavaScript blocks (instances for this bag in MIL terminology) 715a-j (i.e., JS-1, . . . , JS-10) belonging to the particular webpage 314.

Upon receiving all of the JavaScript blocks 715, the web browser 738 uses an unbiased MIL model 711 to classify the webpage 314 (e.g., benign or malicious). However, in this approach, the web browser 738 needs to wait for all the 10 JavaScript blocks 715a-j, which form the complete sets of instances 112 for this webpage 314 (bag) before running the unbiased MIL model 711 to obtain a classification result 744 (e.g., malicious or benign).

Figure 8:
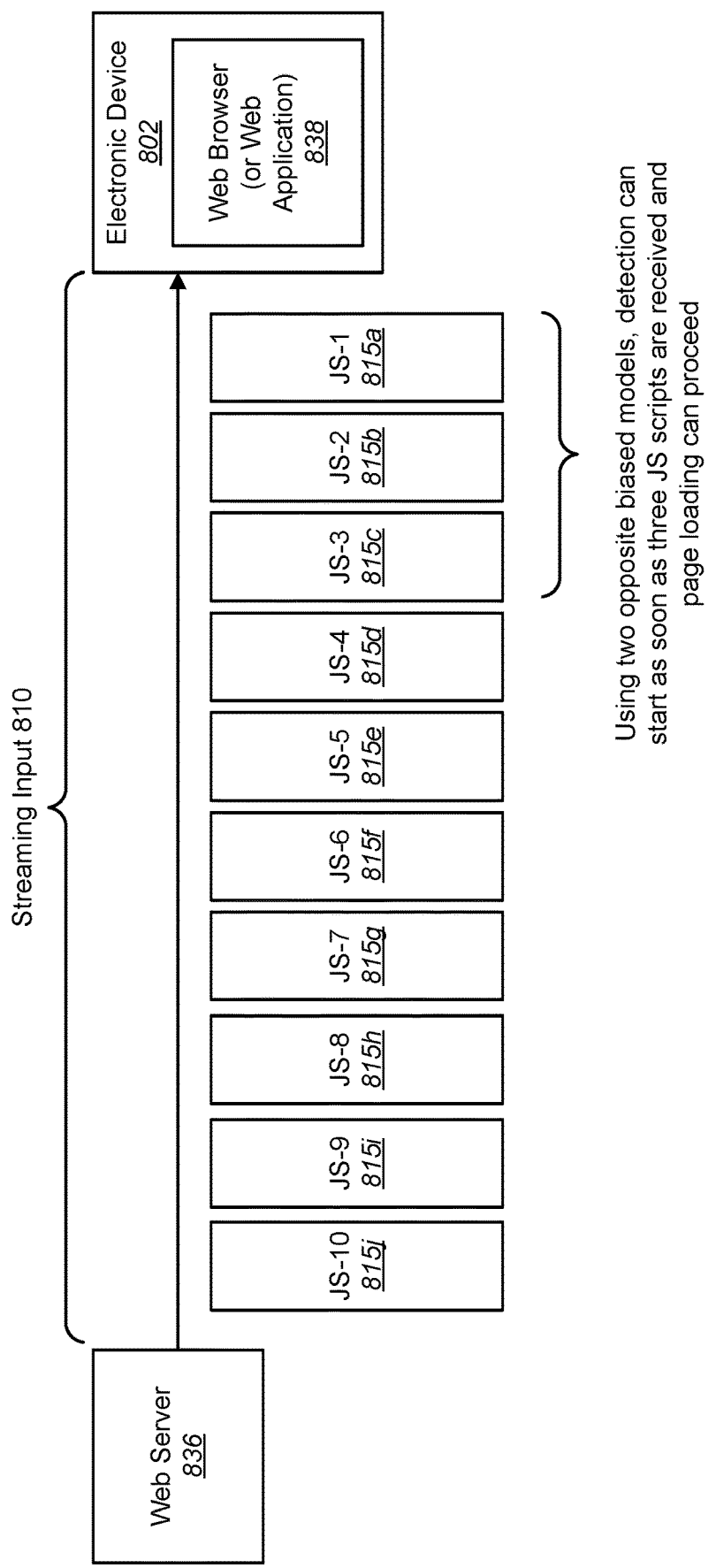
FIG. 8 is a block diagram illustrating one configuration of a system in which incremental MIL-based classification for a streaming input may be implemented.

FIG. 8 is a block diagram illustrating one configuration of a system in which incremental multi-instance learning (MIL)-based classification for a streaming input 810 may be implemented. The system includes a web server 836 and an electronic device 802. The electronic device 802 may be implemented in accordance with the electronic device 102 described in connection with FIG. 1. FIG. 8 illustrates a web security use case.

The web server 836 may host one or more websites with one or more webpages 314. As used herein, a website is a collection of one or more webpages 314. Each webpage 314 may include instances 112. For example, an instance may be a JS block 815.

The web server 836 may send a streaming input 810 to the electronic device 802. This streaming input 810 may be aperiodic or periodic streaming. Additionally, the streaming input 810 may be a response based on client interaction. In this example, the web server 836 sends a series of ten JavaScript (JS) blocks 815a-j. For example, the web server 836 first sends a first JS block (JS-1) 815a followed by a second JS block (JS-2) and so forth.

The electronic device 802 may include a web browser (or web application) 838. The web browser 838 may receive the JavaScript blocks 815a-j. This example shows a stream of JavaScript blocks 815a-j (e.g., files/snippets) gradually being received from the web server 836 hosting the website that is being loaded at the browser 838 in the client device (i.e., electronic device 802).

The web browser 838 may use the two opposite biased MIL models (e.g., model A 104a and model B 104b) for detection of web security threats (e.g., malicious JavaScript blocks 815). The web browser 838 can start MIL classification using the two opposite biased MIL models 104 as soon as an instance threshold 109 number of JavaScript blocks 815 are received. In this example, the instance threshold 109 is 3. If the result of the MIL classification is that the webpage 314 is benign, the web browser 838 may load the webpage 314. It should be noted that in FIG. 8, the selection of the first 3 JavaScript blocks 815 instances is just exemplary. Other values (e.g., the first 2, 4, 5, etc.) could be used for the instance threshold 109 based on implementation choices.

Without the described systems and methods, the web browser 838 would need to wait for all the 10 JavaScript blocks 815 (as described in connection with FIG. 7), which form the complete sets of instances 112 for this webpage 314 (i.e., bag) before an MIL-based detection model may be run. However, with the described systems and methods, the web browser 838 can run the biased MIL models 104 just after receiving three (as an exemplary value) JavaScript blocks 815, and after that the biased MIL models 104 may be re-run after the electronic device 802 receives one or more new JavaScript blocks 815. This approach reduces latency and allows for incremental progress afterwards.

Figure 9:
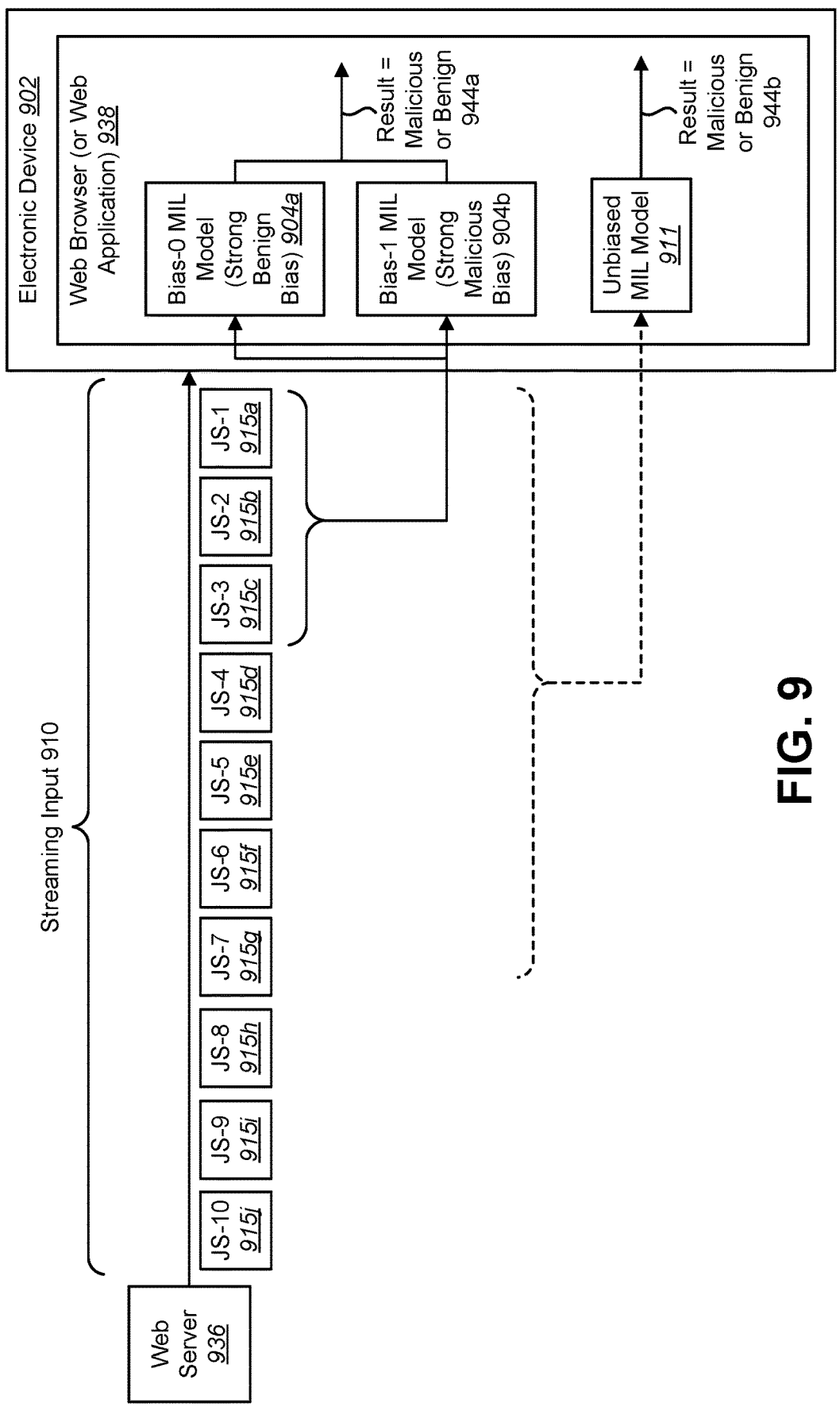
FIG. 9 illustrates another approach to MIL-based classification of a streaming input using opposite biased MIL models.

FIG. 9 illustrates another approach to MIL classification of a streaming input 910 using opposite biased MIL models 904. In this example, MIL-based classification is implemented as described herein. The electronic device 902 includes a web browser (or web application) 938. The web browser 938 is configured with a Bias-0 MIL model (model A) 904a and a Bias-1 MIL model (model B) 904b that have opposite bias. In this implementation, the Bias-0 MIL model 904a has a strong benign bias and Bias-1 MIL model 904b has a strong malicious bias.

Upon receiving an instance threshold 109 number of JavaScript blocks 915 (e.g., 3) from the web server 936, the web browser 938 may run the MIL classification using both the Bias-0 MIL model (model A) 904a and the Bias-1 MIL model (model B) 904b to produce a classification result 944a (e.g., malicious or benign). It should be noted that in FIG. 9, the selection of the first 3 JavaScript blocks 915 instances is just exemplary. Other values (e.g., the first 2, 4, 5, etc.) could be used for the instance threshold 109 based on implementation choices When the biased MIL models 904a-b both predict a strong bias, the classification results may be directly used. For example, the biased MIL models 904a-b may predict a strong bias for a malicious or benign webpage 314. For strong or weak conflicts an unbiased MIL model 911 with more instances of JS blocks 915 (e.g., 7) can be used to produce a classification result 944b (e.g., malicious or benign).

In this implementation, the Bias-0 MIL model (model A) 904a and the Bias-1 MIL model (model B) 904b may be able handle 90% of the cases as seen from experimental studies. The unbiased MIL model 911 may be able to handle the remaining 10% of the cases with strong/weak conflicts. It should be noted that even with the additional use of an unbiased model 911, the MIL classification of the webpage 314 may occur using a subset of instances 112 (i.e., JS blocks 915a-g) instead of the complete set of instances 112 (i.e., JS blocks 915a-j). Therefore, this approach also reduces latency in loading a webpage 314.

Figure 10:
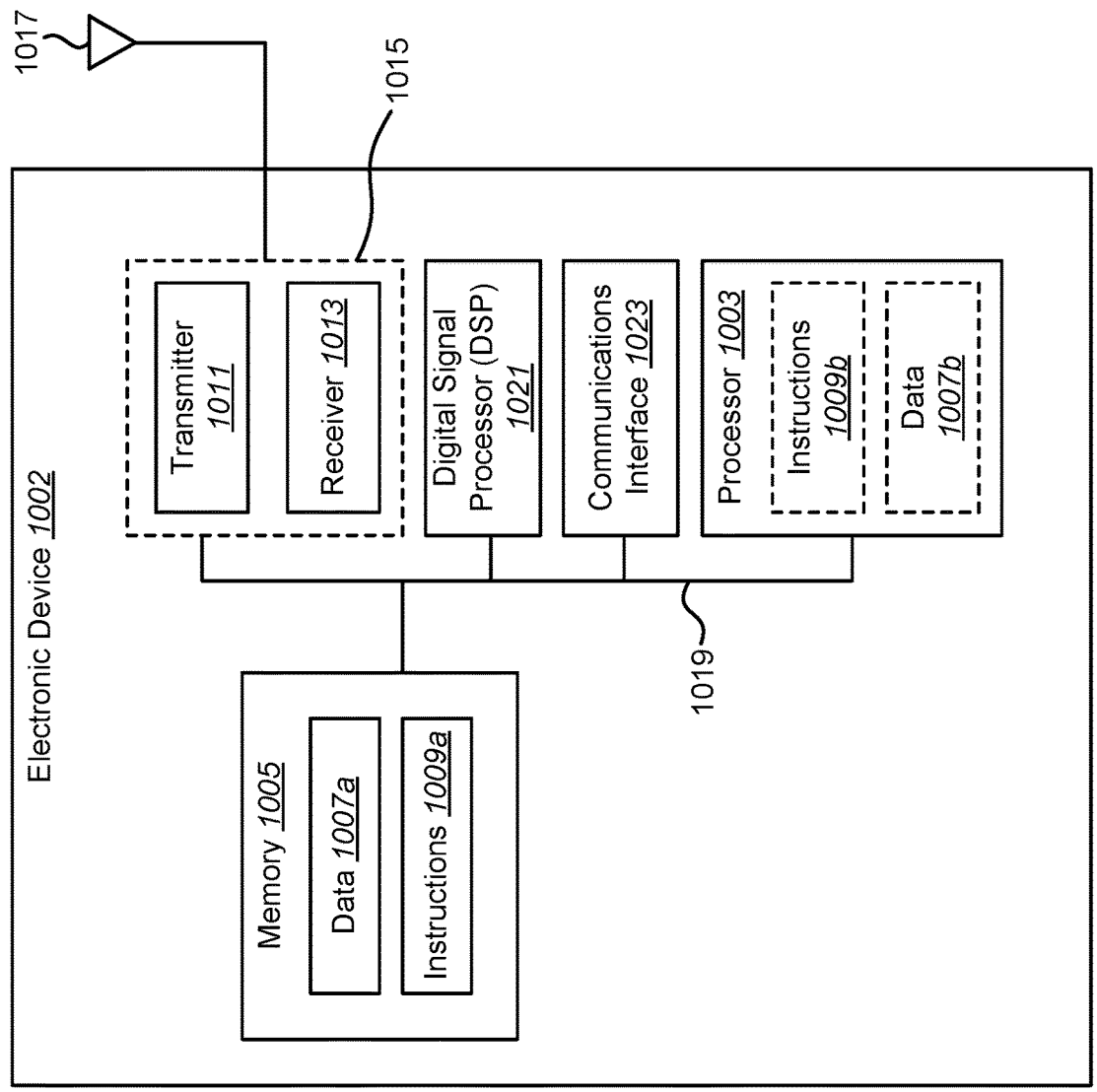
FIG. 10 illustrates certain components that may be included within an electronic device.

FIG. 10 illustrates certain components that may be included within an electronic device 1002. The electronic device 1002 may be a computer, an access terminal, a mobile station, a wireless communication device, a user equipment (UE), etc.

The electronic device 1002 includes a processor 1003. The processor 1003 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1003 may be referred to as a central processing unit (CPU). Although just a single processor 1003 is shown in the electronic device 1002 of FIG. 10, in an alternative configuration, a combination of processors (e.g., an ARM and DSP) could be used.

The electronic device 1002 also includes memory 1005 in electronic communication with the processor 1003 (i.e., the processor can read information from and/or write information to the memory). The memory 1005 may be any electronic component capable of storing electronic information. The memory 1005 may be configured as random access memory (RAM), read-only memory (ROM), magnetic disk storage media, optical storage media, flash memory devices in RAM, on-board memory included with the processor 1003, erasable programmable read-only memory (EPROM), electrically erasable programmable read-only memory (EEPROM), registers and so forth, including combinations thereof.

Data 1007a and instructions 1009a may be stored in the memory 1005. The instructions 1009a may include one or more programs, routines, sub-routines, functions, procedures, code, etc. The instructions 1009a may include a single computer-readable statement or many computer-readable statements. The instructions 1009a may be executable by the processor 1003 to implement the methods disclosed herein. Executing the instructions 1009a may involve the use of the data 1007a that is stored in the memory 1005. When the processor 1003 executes the instructions 1009, various portions of the instructions 1009b may be loaded onto the processor 1003, and various pieces of data 1007b may be loaded onto the processor 1003.

The electronic device 1002 may also include a transmitter 1011 and a receiver 1013 to allow transmission and reception of signals to and from the electronic device 1002 via an antenna 1017. The transmitter 1011 and receiver 1013 may be collectively referred to as a transceiver 1015. The electronic device 1002 may also include (not shown) multiple transmitters, multiple antennas, multiple receivers and/or multiple transceivers.

The electronic device 1002 may include a digital signal processor (DSP) 1021. The electronic device 1002 may also include a communications interface 1023. The communications interface 1023 may allow a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1019.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for multi-instance learning (MIL)-based classification of a streaming input, comprising:
 receiving, by a processor in an electronic device, a threshold quantity of instances of the streaming input over a period of time, wherein each instance comprises a portion of the streaming input, the streaming input comprises a webpage and the instances comprise executable streaming input blocks within the webpage, and wherein the threshold quantity of instances comprises less than a total quantity of instances of the streaming input;
 generating after receiving the threshold number of instances, by the processor prior to executing the streaming input, a first classification result by applying feature vectors that are dynamically extracted from the received threshold number of instances to a first biased MIL model that is biased toward a first classification;
 generating, by the processor prior to executing the streaming input, a second classification result by applying the feature vectors to a second biased MIL model that is biased toward a second classification, wherein the first biased MIL model is biased opposite the second biased MIL model;
 wherein the extracted feature vectors are applied to the first biased MIL model and the second biased MIL model simultaneously for classification;
 using, by the processor, the generated first classification result and the generated second classification result to generate a classification value for the streaming input based on the subset of the received instances of the streaming input and before all of the instances of the streaming input are available at the electronic device;
determining, by the processor, that the generated classification value is not accurate;
in response to determining that the generated classification value is not accurate and prior to both executing the streaming input and receiving the total quantity of instances of the streaming input:
updating at least one of the generated first classification result and the generated second classification result using additional instances of the streaming input; and
updating the generated classification value using at least one of the updated first classification result and the updated second classification result;
determining, by the processor, whether the streaming input is benign based on the updated classification value being accurate; and
executing, by the processor, the benign streaming input in response to determining the updated classification value is accurate.

2. The method of claim 1, wherein the first biased MIL model and the second biased MIL model are each biased towards opposite binary classification types.

3. The method of claim 1, wherein:
the first biased MIL model is generated using a first training set that is biased toward the first classification; and
the second biased MIL model is generated using a second training set that is biased toward the second classification.

4. The method of claim 1, further comprising determining that the updated classification value is accurate in response to determining that the first and second classification results indicate a same classification for the streaming input.

5. The method of claim 1, further comprising determining that the updated classification value is not accurate in response to determining that the first and second classification results each indicate a different classification for the streaming input.

6. The method of claim 5, further comprising generating a third classification result by applying the features extracted from the received threshold number of instances to an unbiased MIL model, wherein using the generated first classification result and the generated second classification result to generate the classification value for the streaming input based on the received threshold number of instances of the streaming input and before all of the instances of the streaming input are available at the electronic device comprises using the generated first classification result, the generated second classification result, and the generated third classification result to generate the classification value for the streaming input based on the received threshold number of instances of the streaming input and before all of the instances of the streaming input are available at the electronic device.

7. The method of claim 1, further comprising updating the first biased MIL model and the second biased MIL model based on the updated classification value.

8. The method of claim 1, wherein
the streaming input blocks comprises JavaScript blocks within the webpage.

9. The method of claim 8, wherein:
generating the first classification result by applying the feature vectors to the first biased MIL model that is biased toward the first classification comprises generating the first classification result by applying the features extracted from a subset of executable streaming input blocks in the webpage to the first biased MIL model that is biased toward the first classification to classify the webpage as either benign or malicious; and
generating the second classification result by applying the feature vectors extracted from the received threshold number of instances to the second biased MIL model that is biased toward the second classification comprises generating the second classification result by applying the features extracted from the subset of executable streaming input blocks in the webpage to the second biased MIL model that is biased toward the second classification to classify the webpage as either benign or malicious.

10. The method of claim 8, wherein the first classification is a benign classification for the webpage and the second classification is a malicious classification for the webpage.

11. The method of claim 8, further comprising allowing the webpage to load in response to determining that both the first biased MIL model and the second biased MIL model indicate that the webpage is benign.

12. The method of claim 8, further comprising preventing the webpage from loading in response to determining that both the first biased MIL model and the second biased MIL model indicate that the webpage is malicious.

13. The method of claim 1, further comprising performing higher order classification of the streaming input beyond binary classification.

14. The method of claim 13, wherein performing the higher order classification comprises combining classification results of a plurality MIL model sets to generate a final classification value, wherein each MIL model set includes two MIL models each biased towards two opposite binary classification types.

15. The method of claim 13, wherein performing the higher order classification comprises:
combining classification results from three or more biased MIL models that are each biased towards a particular classification to generate a final classification value; and
determining that the final classification value is strong and finalized in response to determining that a majority of the biased MIL models indicate the same classification result.

16. The method of claim 15, further comprising generating the final classification value based on a highest frequency classification result in response to determining there is no single majority of the biased MIL models that produce the same classification result.

17. An electronic device configured for multi-instance learning (MIL)-based classification of a streaming input, comprising:
a memory; and
a processor in communication with the memory, the processor configured to:
receive a threshold quantity of instances of the streaming input over a period of time, wherein each instance comprises a portion of the streaming input, the streaming input comprises a webpage and the instances comprise executable streaming input blocks within the webpage, and wherein the threshold quantity of instances comprises less than a total quantity of instances of the streaming input;
generate after receiving the threshold number of instances, and prior to executing the streaming input, a first classification result by applying feature vectors that are dynamically extracted from the received threshold number of instances to a first biased MIL model that is biased toward a first classification;

generate, prior to executing the streaming input, a second classification result by applying the feature vectors to a second biased MIL model that is biased toward a second classification, wherein the first biased MIL model is biased opposite the second biased MIL model;

wherein the extracted feature vectors are applied to the first biased MIL model and the second biased MIL model simultaneously for classification;

use the generated first classification result and the generated second classification result to generate a classification value for the streaming input based on the subset of the received instances of the streaming input and before all of the instances of the streaming input are available at the electronic device;

determine that the generated classification value is not accurate;

in response to determining that the generated classification value is not accurate and prior to both executing the streaming input and receiving the total quantity of instances of the streaming input:

update at least one of the generated first classification result and the generated second classification result using additional instances of the streaming input; and update the generated classification value using at least one of the updated first classification result and the updated second classification result;

determine whether the streaming input is benign based on the updated classification value being accurate; and execute the benign streaming input in response to determining the updated classification value is accurate.

18. The electronic device of claim 17, wherein:
the first biased MIL model is generated using a first training set that is biased toward the first classification; and
the second biased MIL model is generated using a second training set that is biased toward the second classification.

19. The electronic device of claim 17, wherein the processor is further configured to:
determine that the updated classification value is accurate in response to determining that the first and second classification results indicate a same classification for the streaming input; or
determine that the updated classification value is not accurate in response to determining that the first and second classification results each indicate a different classification for the streaming input.

20. The electronic device of claim 17, wherein
the streaming input blocks comprise JavaScript blocks within the webpage.

21. The electronic device of claim 20, wherein the processor is configured to:
generate the first classification result by applying the feature vectors to the first biased MIL model that is biased toward the first classification by generating the first classification result by applying the features extracted from a subset of executable streaming input blocks in the webpage to the first biased MIL model that is biased toward the first classification to classify the webpage as either benign or malicious; and
generate the second classification result by applying the feature vectors to the second biased MIL model that is biased toward the second classification comprises generating the second classification result by applying the features extracted from the subset of streaming input blocks in the webpage to the second biased MIL model that is biased toward the second classification to classify the webpage as either benign or malicious.

22. A non-transitory tangible computer readable medium having stored thereon processor-executable software instructions configured to cause a processor in an electronic device to perform operations for multi-instance learning (MIL)-based classification of a streaming input, the operations comprising:

receiving, by a processor in an electronic device, a threshold quantity of instances of the streaming input over a period of time, wherein each instance comprises a portion of the streaming input, the streaming input comprises a webpage and the instances comprise executable streaming input blocks within the webpage, and wherein the threshold quantity of instances comprises less than a total quantity of instances of the streaming input;

generating after receiving the threshold number of instances, by the processor prior to executing the streaming input, a first classification result by applying feature vectors that are dynamically extracted from the received threshold number of instances to a first biased MIL model that is biased toward a first classification;

generating, by the processor prior to executing the streaming input, a second classification result by applying the feature vectors to a second biased MIL model that is biased toward a second classification, wherein the first biased MIL model is biased opposite the second biased MIL model;

wherein the extracted feature vectors are applied to the first biased MIL model and the second biased MIL model simultaneously for classification;

using, by the processor, the generated first classification result and the generated second classification result to generate a classification value for the streaming input based on the subset of the received instances of the streaming input and before all of the instances of the streaming input are available at the electronic device;

determining, by the processor, that the generated classification value is not accurate;

in response to determining that the generated classification value is not accurate and prior to both executing the streaming input and receiving the total quantity of instances of the streaming input:

updating at least one of the generated first classification result and the generated second classification result using additional instances of the streaming input; and updating the generated classification value using at least one of the updated first classification result and the updated second classification result;

determining, by the processor, whether the streaming input is benign based on the updated classification value being accurate; and executing, by the processor, the benign streaming input in response to determining the updated classification value is accurate.

23. The computer readable medium of claim 22, wherein:
the first biased MIL model is generated using a first training set that is biased toward the first classification; and
the second biased MIL model is generated using the second training set that is biased toward a second classification.

24. The computer readable medium of claim 22, wherein the streaming input blocks comprise JavaScript blocks within the webpage.

25. An apparatus for multi-instance learning (MIL)-based classification for a streaming input, comprising:
means for receiving a threshold quantity of instances of the streaming input over a period of time, wherein each instance comprises a portion of the streaming input, the streaming input comprises a webpage and the instances comprise executable streaming input blocks within the webpage, and wherein the threshold quantity of instances comprises less than a total quantity of instances of the streaming input;
means for generating after receiving the threshold number of instances, prior to executing the streaming input, a first classification result by applying feature vectors that are dynamically extracted from the received threshold number of instances to a first biased MIL model that is biased toward a first classification;
means for generating, prior to executing the streaming input, a second classification result by applying the features feature vectors to a second biased MIL model that is biased toward a second classification, wherein the first biased MIL model is biased opposite the second biased MIL model;
wherein the extracted feature vectors are applied to the first biased MIL model and the second biased MIL model simultaneously for classification;
means for using, the generated first classification result and the generated second classification result to generate a classification value for the streaming input based on the subset of the received instances of the streaming input and before all of the instances of the streaming input are available at the electronic device;
means for determining that the generated classification value is not accurate; means for updating at least one of the generated first classification result and the generated second classification result using additional instances of the streaming input in response to determining that the generated classification value is not accurate and prior to both executing the streaming input and receiving the total quantity of instances of the streaming input; and
means for updating the generated classification value using at least one of the updated first classification result and the updated second classification result in response to determining that the generated classification value is not accurate and prior to both executing the streaming input and receiving the total quantity of instances of the streaming input;
means for determining, by the processor, whether streaming input is benign based on the updated classification value being accurate; and
means for executing the benign streaming input in response to determining the updated classification value is accurate.

26. The apparatus of claim 25, wherein:
the first biased MIL model is generated using a first training set that is biased toward the first classification; and
the second biased MIL model is generated using a second training set that is biased toward the second classification.

27. The apparatus of claim 25, wherein
the streaming input blocks comprise JavaScript blocks within the webpage.

* * * * *